(12) United States Patent
Khare et al.

(10) Patent No.: US 9,135,682 B2
(45) Date of Patent: Sep. 15, 2015

(54) IMAGE RECOVERY FROM SINGLE SHOT DIGITAL HOLOGRAM

(71) Applicant: Indian Institute of Technology Delhi, New Delhi (IN)

(72) Inventors: Kedar Bhalchandra Khare, New Delhi (IN); Joby Joseph, New Delhi (IN); Samsheerali Pothiyil Thottiparambil, Kerala (IN)

(73) Assignee: Indian Institute of Technology Delhi (IN)

( * ) Notice: Subject to any disclaimer, the term of this patent is extended or adjusted under 35 U.S.C. 154(b) by 207 days.

(21) Appl. No.: 13/838,562

(22) Filed: Mar. 15, 2013

(65) Prior Publication Data

US 2014/0270456 A1 Sep. 18, 2014

(51) Int. Cl.
| | |
|---|---|
| G06K 9/00 | (2006.01) |
| G06T 5/00 | (2006.01) |
| G06T 3/40 | (2006.01) |
| G03H 1/08 | (2006.01) |
| G03H 1/04 | (2006.01) |
| G01B 9/021 | (2006.01) |

(52) U.S. Cl.
CPC .............. *G06T 5/002* (2013.01); *G03H 1/0443* (2013.01); *G03H 1/0866* (2013.01); *G06T 3/4076* (2013.01); *G03H 2001/0883* (2013.01); *G03H 2210/12* (2013.01)

(58) Field of Classification Search
USPC ............. 382/6–107, 128–134, 154, 162, 168, 382/173, 181, 191–194, 203, 209, 219, 232, 382/254, 274–276, 286, 291, 305, 312; 250/208.1, 201.9; 356/432, 457; 65/30.14; 359/9
See application file for complete search history.

(56) References Cited

U.S. PATENT DOCUMENTS

| | | | | |
|---|---|---|---|---|
| 3,880,630 | A * | 4/1975 | Izawa | 65/30.14 |
| 6,262,818 | B1 * | 7/2001 | Cuche et al. | 359/9 |
| 7,365,851 | B2 * | 4/2008 | Ozcan et al. | 356/432 |
| 7,649,160 | B2 * | 1/2010 | Colomb et al. | 250/201.9 |
| 2012/0248292 | A1 * | 10/2012 | Ozcan et al. | 250/208.1 |

OTHER PUBLICATIONS

Kim, M. K., "Principles and techniques of digital holographic microscopy", SPIE Digital Library, May 2010, 51 pages.

(Continued)

*Primary Examiner* — Seyed Azarian
(74) *Attorney, Agent, or Firm* — Moritt Hock & Hamroff LLP; Steven S. Rubin, Esq.

(57) ABSTRACT

Techniques described herein are generally related to high resolution image recovery of objects from digital holograms. The various described techniques may be applied to methods, systems, devices or combinations thereof. Some described methods for recovering an image may include receiving reference beam data that corresponds to a reference interference pattern and receiving hologram data corresponding to an object. The method may also include applying a cost function to the hologram data and the reference beam data to determine the object image data associated with the object. The cost function may include a smoothness constraint applied to the object image data. The cost function can be iteratively reduced to obtain object image data corresponding to the object and the obtained object image data can be processed to recover the image of the object from single shot holograms with image resolution greater than conventional holographic imaging system.

30 Claims, 6 Drawing Sheets

(56) References Cited

OTHER PUBLICATIONS

"Digital Holographic Microscope Overview—Description", accessed at http://www.lynceetec.com/dhm-digital-holographic-microscopy/, downloaded Dec. 10, 2014, 2 pages.

"Digital Holographic Microscope Overview—Benefits", accessed at http://www.lynceetec.com/dhm-digital-holographic-microscopy/, downloaded Dec. 10, 2014, 2 pages.

"Digital Holographic Microscope Overview—Specifications", accessed at http://www.lynceetec.com/dhm-digital-holographic-microscopy/ downloaded Dec. 10, 2014, 3 pages.

"Reflection DHM", accessed at http://www.lynceetec.com/reflection-dhm/, downloaded Dec. 10, 2014, 1 page.

"Transmission DHM", accessed at http://www.lynceetec.com/transmission-dhm/, downloaded Dec. 10, 2014, 1 page.

* cited by examiner

IMAGE RECOVERY FROM SINGLE SHOT DIGITAL HOLOGRAM

BACKGROUND

Unless otherwise indicated herein, the approaches described in this section are not prior art to the claims in this application and are not admitted to be prior art by inclusion in this section.

Digital holography (DH) can be used, for example, in bio-imaging, microscopy, optical metrology, phase contrast and quantitative phase imaging and nondestructive imaging applications. Digital holography systems can include a sensor array for recording of a hologram or an interference pattern between a reference beam and an object beam derived from a light source for obtaining image data associated with an object. Such systems can have image reconstruction algorithms to reconstruct images from the image data.

Sensor array detectors, such as charged-coupled device (CCD) or complimentary metal-oxide semiconductor (CMOS) device, can be used in a digital holography system. In such systems, the image reconstruction algorithms can be similar to physical hologram reconstruction algorithms. As a result, the recovered images can include artifacts such as corresponding to dc and twin image terms of the obtained hologram when a single hologram frame is used for image recovery. Further the image resolution in off-axis digital holography can be limited by a minimum reference beam angle condition that is required in order to separate the dc and cross terms in the interference pattern in the Fourier transform domain. In certain digital holography systems, multiple hologram frames may be required to achieve high resolution images of the imaged object. Such systems may not be able to provide live (e.g., real-time) high resolution imaging of the object.

In certain imaging applications, brightfield microscopes can be used to obtain images of transparent objects such as live biological cells. In such applications, contrast agents such as a dye or fluorescent labels can be applied (e.g., staining) to the objects that may be difficult to be visualized solely by transmission of light through the object. The application of the contrast agent can damage the objects (e.g., the cells). In certain other imaging applications, three-dimensional imaging of objects can be performed using laser scanning confocal microscopes, which can be substantially expensive compared to brightfield microscopes.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

Techniques described herein are generally related to image recovery of objects from digital holograms. The various described techniques may be applied to methods, systems, devices or combinations thereof. Some described methods for recovering an image may include receiving reference beam data that corresponds to a reference interference pattern and receiving hologram data corresponding to an object. The method may also include applying a cost function to the hologram data and the reference beam data to determine the object image data associated with the object. The cost function may include a smoothness constraint applied to the object image data. The cost function can be iteratively reduced to obtain object image data corresponding to the object and the obtained object image data can be processed to recover the image of the object.

According to some additional examples of the present disclosure, methods related to recovering an image of an object are described. The methods may include receiving a reference beam from a light source and receiving an object beam that is reflected from an object. The reference beam and the object beam can interfere to generate an interference pattern. Hologram data and reference beam data corresponding to the interference pattern and reference interference pattern respectively can be obtained. A cost function can be applied to the hologram data and the reference beam data to determine object image data corresponding to the object and the cost function may include a smoothness constraint applied to the object image data. The cost function can be iteratively reduced to obtain object image data and the obtained image data can be processed to recover the image of the object.

According to still further examples of the present disclosure, apparatus for recovering image data associated with the object are described. The apparatus can include an optical assembly that can be configured to receive a reference beam and an object beam associated with the object and to interfere the reference beam and the object beam to generate an interference pattern. The apparatus can further include an image processor that can be configured to receive an output of the optical assembly and to apply a cost function to hologram data and reference beam data corresponding to the interference pattern and the reference interference pattern respectively. The image processor can be configured to iteratively reduce the cost function to obtain object image data corresponding to the object.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Example embodiments of the present disclosure are generally directed to techniques for image recovery of objects from single shot digital holograms. The technique may include obtaining object image data by approximately minimizing a constrained cost function applied to hologram data that corresponds to an object. The technique may provide a high resolution image of the object generated from the obtained object image data. The technique facilitates high resolution image recovery from a single shot digital hologram without requiring multiple hologram frames. The achieved dynamic high resolution of the obtained images is substantially higher than resolution of images obtained by conventional holographic imaging systems. The technique may enable three dimensional imaging of a variety of objects such as live biological cells without the use of any staining or fixing and may facilitate dynamic observation of such objects.

Figure 1:
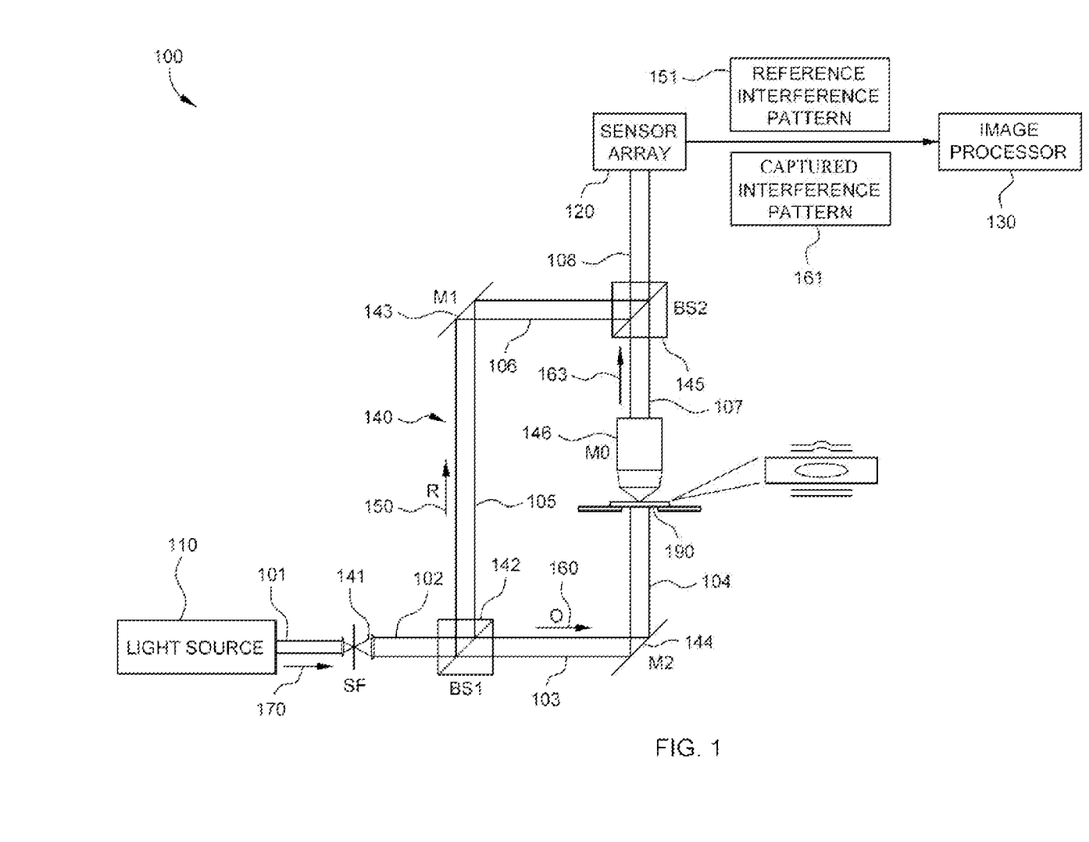
FIG. 1 is a schematic diagram illustrating an example system configured to recover image data associated with an object.

FIG. 1 is a schematic diagram illustrating an example system 100 configured to recover image data associated with an object 190, arranged in accordance with at least some embodiments of the present disclosure. The example system 100 may include one or more components such as a light source 110, a sensor array 120, an image processor 130, and an optical assembly 140.

The optical assembly 140 may include various additional components, such as one or more of, a spatial filter (SF) 141, a first beam splitter (BS1) 142, a first mirror (M1) 143, a second mirror (M2) 144, a second beam splitter (BS2) 145 and a microscope objective (MO) 146. Although the various components are illustrated as discrete blocks, the various blocks may be combined into fewer blocks, divided into additional blocks, and/or eliminated based upon the desired implementation.

The various components in system 100 can be configured as follows below. Light source 110 includes an output aligned along a first optical path 101, which is also aligned with a first side of the spatial filter (SF) 141. A second side of the spatial filter 141 is aligned along a second optical path 102, which is aligned with a first side of the first beam splitter (BS1) 142. A second side of the first beam splitter (BS1) 142 is aligned along a third optical path 103, which is aligned with a surface of the second mirror (M2) 144. The surface of the second mirror (M2) 144 is also aligned along a fourth optical path 104, which is aligned with a first side of the microscope objective (MO) 146. A second side of the microscope objective 146 is aligned along a seventh optical path 107 with a first side of the second beam splitter (BS2) 145.

The first side of the first beam splitter (BS1) 142 is also aligned along a fifth optical path 105, which is aligned with a surface of the first mirror (M1) 143. The surface of the first mirror (M1) 143 is also aligned along a sixth optical path 106, which is aligned with a second side of the second beam splitter (BS2) 145. The second side of the second beam splitter (BS2) 145 is also aligned along an eighth optical path 108, which is aligned with an input of the sensor array 120. An output of the sensor array 120 is coupled to the image processor 130.

In operation, the light source 110 is configured to transmit (or project) beam 170 along the optical path 101 to the spatial filter 141, which passes a filtered beam to the first beam splitter (BS1) 142 along optical path 102. The first beam splitter 142 is configured to receive the filtered beam, reflect a first portion of the filtered beam along optical path 105 as a reference beam (R) 150, and transmit a second portion of the filtered beam along optical path 103 as an object beam (O) 160. The first mirror 143 is configured to receive the reference beam 150, and reflect the reference beam along optical path 106 to the second beam splitter 145. The second mirror 144 is configured to receive the object beam 160 and reflect the object beam along optical path 105.

Object 190 is positioned in the optical path 104, and thus the object 190 is illuminated by object beam 160. Microscope objective 146 is configured to receive a portion of the object beam 160 from optical path 104 and transmit the received portion of the object beam 163 along the seventh optical path 107 to the second beam splitter 145. The second beam splitter 145 is configured to receive the beams from the sixth optical path 106 and seventh optical path 107, combine the beams into a captured interference pattern 161, and transmit the captured interference pattern 161 to the sensor array 120 along the eighth optical path 108.

The various components illustrated as part of the optical assembly 140, can be rearranged without departing from the spirit of the present disclosure. For example, in some implementation, the first beam splitter 142 can be configured to transmit to object 190 without the use of the second mirror 144. In additional examples, the first beam splitter 142 can be configured to transmit to the second beam splitter 145, without the use of the first mirror 143. In further examples, the microscope objective 146 can be configured to transmit to another optical device (e.g., a mirror, a lens, a filter, etc.) that is configured in alignment with the second beam splitter 145 such that the microscope objective 146 indirectly transmits beams to the beam splitter. Additional mirrors, lenses, and filters may also be employed throughout the system to facilitate an efficient or convenient physical orientation as may be desired in other implementations, while maintaining a substantially similar operational result.

As described above, the optical assembly 140 can be configured to receive a reference beam 150 that corresponds to a reference interference pattern 151 and an object beam 160 associated with the object 190. In certain embodiments, the reference interference pattern 151 is generated by the optical assembly 140 based on interference of two plane waves. The generation of the reference interference pattern 151 may be performed once using the optical assembly 140 and the generated reference interference 151 patterns may be captured by the sensor array 120 and utilized by the image processor 130 for recovering the image of the object 190. The sensor array 120 can be configured to capture or record the interference between the beams. The optical assembly 140 can be further configured to interfere the reference beam 150 with the object beam 160 effective to generate the captured interference pattern 161 recorded by the sensor array 120.

In some examples, the optical assembly 140 may be a commercially available interferometer. Examples of the optical assembly 140 may include, but are not limited to, a Mach-Zehnder interferometer, a Michelson Twyman-Green interferometer, a point-diffraction interferometer, a shearing interferometer, a Talbot interferometer, a Lau-Talbot interferometer, or combinations thereof.

In the illustrated embodiment, the optical assembly 140 can include a Mach-Zehnder interferometer that can be configured to generate the reference interference pattern 151 based on an interference of two plane waves. In the illustrated system, the light source 110 can be configured to generate a beam 170. Examples of light source 110 may include, but are not limited to, a helium-neon (He—Ne) laser, a solid state diode laser, a gas laser, or combinations thereof. The light source 110 may be selected based upon properties such as spatial coherence extending over sample area and temporal coherence. For example, light fields in the reference beam 150 and the object beam 160 can travel different optical paths and sufficient temporal coherence is maintained in order to observe interference. In various embodiments, the light source 110 can be configured to generate beam 170 as a plane beam. In additional embodiments, the light source 110 can be configured to generate beam 170 as a spherical beam. In yet other embodiments, the light source 110 can be configured to generate beam 170 as a coded beam.

As illustrated in FIG. 1, the beam 170 from the light source 110 may optionally be passed through the spatial filter 141 of the optical assembly 140 to remove any aberrations in the beam 170, where the first beam splitter 142 of the optical assembly 140 is configured to split the beam 170 and to generate the reference beam 150 and the object beam 160. In various embodiments, the light source 110 can be configured to generate beam 170 as an ultra violet (UV) beam. In additional embodiments, the light source 110 can be configured to generate beam 170 as a visible beam. In yet other embodiments, the light source can be configured to generate beam 170 as an infrared beam. In other embodiments, the light source can be configured to generate beam 170 as a terahertz beam. In some other embodiments, the light source can be configured to generate beam 170 as an X-ray beam. The optical assembly 140 can optionally include the first mirror (M1) 143 to provide a tilt in the reference beam 150 for an off axis digital holographic microscope (DHM) configuration.

The object beam 160 may be transmitted to the object 190 and may be optionally passed through a second mirror (M2) 144 to facilitate interaction with the object 190. In some embodiments, the object beam 160 may be reflected from the object 190 to generate a reflected beam 163 that interferes with the reference beam 150. The optical assembly 140 can include the microscope objective 146, which can be configured to receive reflected light from the object 190 over a desired field of view. The sensor array 120 of the system 100 can be configured to receive the captured interference pattern 161 generated by the interference of the reference beam 150 and the object beam 160.

Further, the image processor 130 of the system 100 can be configured to receive an output of the optical assembly 140, such as the reference interference pattern 151 and the captured interference pattern 161 from the sensor array 120. The image processor 130 may be configured to process such data to recover the image of the object 190 as will be described with reference to FIG. 2.

Figure 2:
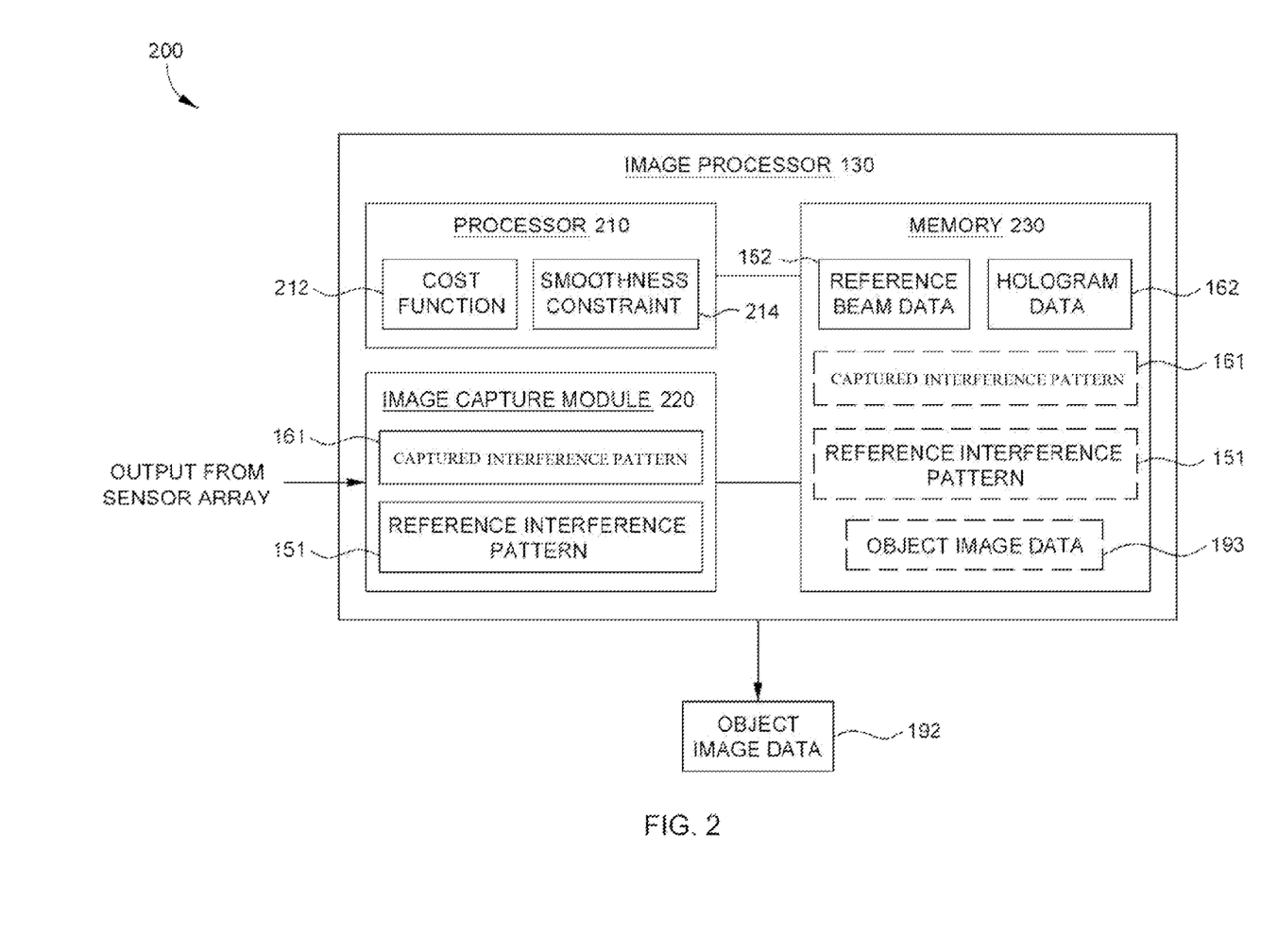
FIG. 2 is a schematic diagram illustrating an example configuration of the image processor of FIG. 1.

FIG. 2 is a schematic diagram illustrating an example configuration 200 of the image processor 130 of FIG. 1, arranged in accordance with at least some embodiments of the present disclosure. The example image processor 200 may include one or more components such as a processor 210, an image capture module 220, and a memory 230. Although the various components are illustrated as discrete blocks, the various blocks may be combined into fewer blocks, divided into additional blocks, and/or eliminated based upon the desired implementation. The image capture module 220 may be coupled to the sensor array 120 and the processor 210. The memory 230 may be coupled to the processor 210 and the image capture module 220.

In operation, the image capture module 220 may be configured to receive output (such as the reference interference pattern 151 and/or the captured interference pattern 161) from the sensor array 120. In certain embodiments, the reference interference pattern 151 is generated by the optical assembly 140 based on interference of two plane waves. The generation of the reference interference pattern 151 may be performed once using the optical assembly 140 and the generated reference interference 151 patterns may be captured by the sensor array 120 and utilized by the image processor 130 for recovering the image of the object 190. The memory 230 may be configured to receive and store reference beam data 152 that may correspond to the reference interference pattern 151 from the sensor array 120. The memory 230 may also be configured to receive hologram data 162 that corresponds to the captured interference pattern 161 received from the sensor array 120. In some embodiments, the memory 230 can optionally store the reference interference pattern 151 and the captured interference pattern 161.

The processor 210 may be configured to apply a cost function 212 to the hologram data 162 and the reference beam data 152 and to iteratively reduce the cost function 212 to obtain object image data 192 corresponding to the object 190. In this example embodiment, the processor 210 may be configured to apply a smoothness constraint 214 to the cost function 212. In some example embodiments, the memory 230 may be configured to store intermediate object image data 193 while the cost function 212 is iteratively reduced by the processor 210 to achieve an approximately minimized function.

As described further below with reference to FIGS. 3 and 4, a variety of cost functions and smoothness constraints may be used by the image processor 130 to iteratively reduce the cost function 212 and to obtain the object image data 192 corresponding to the object 190. Example cost functions 212 that may be applied to the hologram data 162 and the reference beam data 152 may include, but are not limited to, least squares (L2-norm), weighted least squares, maximum entropy reconstruction, maximum-likelihood reconstruction, expectation maximization reconstruction or combinations thereof.

The image processor 130 may be configured to process the obtained object image data 192 to recover the image of the object 190. For example, the obtained object image data 192 may be convolved with a back-Fresnel impulse response to recover the image of the object 190. In some examples, an image resolution of the recovered image of the object 190 can be greater than the image resolution estimated using the relationship: $(2 \sin \theta/3\lambda)$, where $\lambda$ is the wavelength of light used, and $\theta$ is the nominal angle between the object beam 160 and the reference beam 150.

Figure 3:
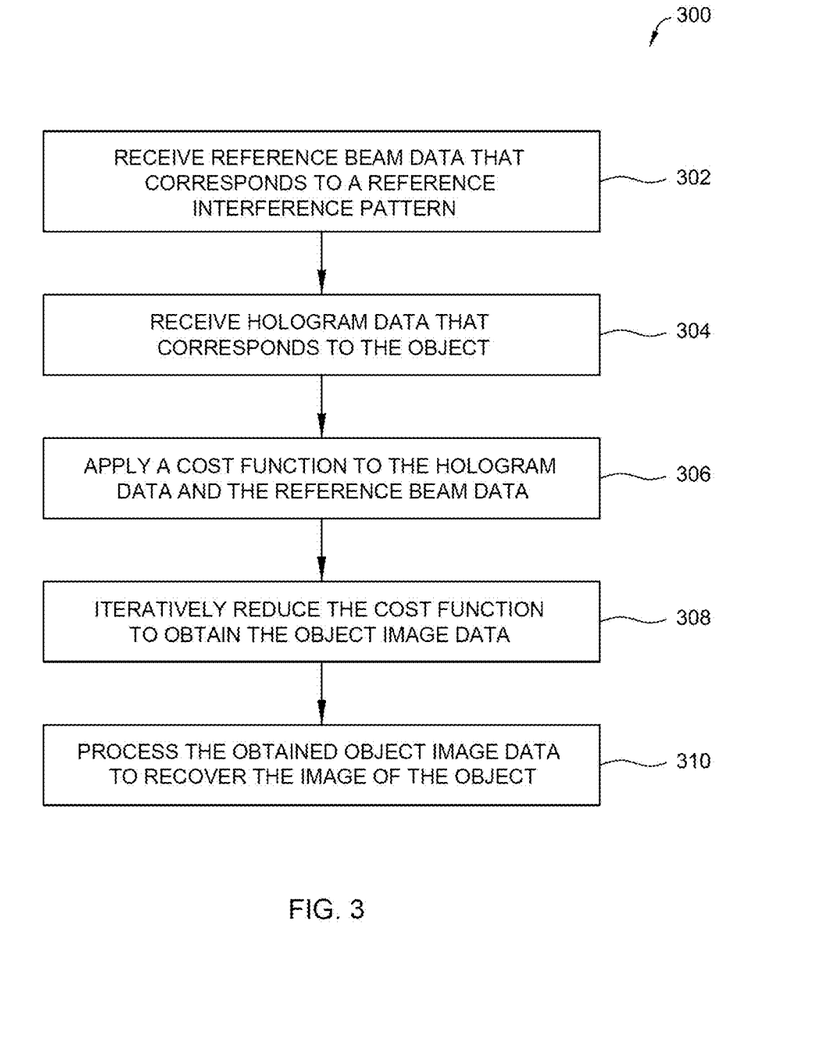
FIG. 3 is an illustration of an example process for recovering an image of an object.

FIG. 3 is an illustration of an example process 300 for recovering an image of an object arranged in accordance with at least some embodiments described herein. Process 300 may include one or more operations, functions or actions as illustrated by one or more of blocks 302-310. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation. Process 300 may begin at block 302.

At block 302, "RECEIVE REFERENCE BEAM DATA THAT CORRESPONDS TO A REFERENCE INTERFERENCE PATTERN", where reference beam data (152) that corresponds to a reference interference pattern (151) can be received by an image processor (130). The reference interference pattern (151) may be obtained by capturing and recording an interference of two plane waves using an interferometer. This obtained reference interference pattern (151) may be demodulated using a Fourier transform to obtain the reference beam data (152). In some embodiments, obtained reference interference pattern (151) may be demodulated using a Hilbert transform to obtain the reference beam data (152).

Process 300 may continue from block 302 to block 304, "RECEIVE HOLOGRAM DATA THAT CORRESPONDS TO THE OBJECT", where hologram data (162) that corresponds to the object (190) can be received by the image processor (130). In various examples, the object (190) may correspond to either a transparent object or a semi-transparent object. In one example, the object (190) may include one or more live cells of a biological tissue. In certain other examples, the object (190) may include one or more tissues, small organisms, inspection circuits, or combinations thereof.

The hologram data (162) may be obtained based on interference between the reference beam (150) and an object beam (160) that is transmitted to the object (190). In some examples, a beam (170) from a light source (110) can be split into the reference beam (R) (150) and the object beam (O) (160) such as by the beam splitter 142 in FIG. 1. The object beam (O) (160) can be transmitted to the object (190). In one embodiment, the object beam (160) can be reflected from the object (190), to generate a reflected beam (163). The captured interference pattern (161) of the reference beam (150) and the reflected beam (163) can be recorded with the sensor array (120) and hologram data (162) may be generated based on the interference pattern/recorded hologram between reference beam (R) (150) and the object beam (O) (160).

In some embodiments, hologram data H (162) can be recorded that results from the interference of an object beam $O(x,y)$ (160) and a reference beam $R(x,y)$ (150) in a detector plane, which can be represented by the following relationship:

$$H = |O|^2 + |R|^2 + OR^* + O^*R \tag{1}$$

The terms $|O|^2 + |R|^2$ in eq. (1) are centered at zero frequency in a 2D Fourier transform space and therefore these terms can be referred to as dc terms. Further, the location of cross terms $(O^*R)$ can be obtained by a carrier frequency corresponding to an off-axis angle $\theta$ of the reference beam. In some examples, suppression of the dc terms and the twin image term $(O^*R)$ can be achieved using a cost function that is described in greater detail below.

In some embodiments, a lateral (x,y) resolution limit of single shot digital holographic systems is determined by a condition of non-overlap of the dc and the cross terms in the 2-dimensional Fourier transform of the recorded hologram pattern. In certain embodiments, this limit is typically much lower than the resolution limit determined by a detector pixel size. In some embodiments, this lateral resolution limit is about four times lower than the resolution limit determined by a detector pixel size. This may be indicative of an inefficient use of the detector. The present technique facilitates recovery of images with image resolution substantially higher than this lateral resolution limit as will be described below.

Process 300 may continue from block 304 to block 306, "APPLY A COST FUNCTION TO THE HOLOGRAM DATA AND THE REFERENCE BEAM DATA", a cost function (212) can be applied to the hologram data (162) and the reference beam data (152) by an image processor (130) to determine object image data (192) associated with the object (190). The cost function (212) may include a smoothness constraint (214). Example cost functions (212) that may be applied to the hologram data (162) and the reference beam data may include, but are not limited to, least squares (L2-norm), weighted least squares, maximum entropy reconstruction, maximum-likelihood reconstruction, or combinations thereof.

In some example embodiments, the cost function C (212) may be applied to the hologram data H (162), the reference beam data R (152) and the object image data O (192) in accordance with the following relationship:

$$C(O,O^*) = 1/2 \| H - (|O|^2 + |R|^2 + OR^* + O^*R) \|^2 + \alpha\psi(O,O^*) \tag{2}$$

where $\psi(O,O^*)$ is the smoothness constraint and $\alpha$ is a positive constant representing the relative weight between the two terms of the cost function;

the term $$1/2 \| H - (|O|^2 + |R|^2 + OR^* + O^*R) \|^2$$

represents the least square or L2 norm squared error data fit; and the smoothness constraint $\alpha\psi(O,O^*)$ may be selected to apply a smoothness constraint on the object image data O.

In various example embodiments, the smoothness constraint $\alpha\psi(O,O^*)$ can be estimated by the image processor (130) for the object image data O (192) in accordance with the following relationship:

$$\alpha\psi(O, O^*) = \sum_P \sum_{q \in N_p} w_{pq} |O_p - O_q|^2, \tag{3}$$

where $\alpha$ is a weight parameter, $O_p$ is the value of O at the pth pixel, index q is in the neighborhood $N_p$ of the pixel of p; and $w_{pq}$ is a weight function.

In some examples, $w_{pq}$ can be a decreasing function of distance between pixels p and q. For example, $w_{pq}$ may vary inversely as the distance between pixels p and q.

Though the technique is described herein with the L2 norm cost function and a quadratic function for the smoothness constraint (214), a variety of other cost functions and smoothness constraints may be used for obtaining the object image data.

In some examples, the cost function C (212) can be applied to the hologram data H (162), the reference beam data R (152) and the object image data O (192) may be based on the weighted L2 norm function in accordance with the following relationship:

$$C(O,O^*) = 1/2 \| W \cdot [H - (|O|^2 + |R|^2 + OR^* + O^*R)] \|^2 + \alpha\psi(O,O^*) \tag{4}$$

where, W is a weight function;

the term $$1/2 \| W \cdot [H - (|O|^2 + |R|^2 + OR^* + O^*R)] \|^2$$

represents the weighted L2 norm squared error data fit; and the smoothness constraint $\alpha\psi(O,O^*)$ may be selected to apply a smoothness constraint on the object image data O.

In another example, the cost function C (212) can be applied to the hologram data H (162), the reference beam data R (152) and the object image data O (192) may be based on maximum likelihood function in accordance with the following relationship:

$$C(O,O^*) = -L(H,O,O^*) + \alpha\psi(O,O^*) \tag{5}$$

where, the term $L(H,O,O^*)$ represents log-likelihood and is estimated in accordance with the following relationship:

$$-L(H, O, O^*) = -\sum_i \log p(H_i | O_i) \tag{6}$$

The term p(H|O) may represent a conditional probability of finding image H given the object function O and the smoothness constraint $\alpha\psi(O,O^*)$ may be selected to impose a smoothness constraint on the object image data O. In certain embodiments, the conditional probability p(H|O) can be represented as a Poisson distribution. In certain other embodiments, the conditional probability p(H|O) can be represented as a Gaussian distribution.

In another example, the cost function C (212) may be applied to the hologram data H (162), the reference beam data R (152) and the object image data O (192) may be based on maximum entropy function in accordance with the following relationship:

$$C(O,O^*)=E(H,O,O^*)+\alpha\psi(O,O^*) \quad (7)$$

The term -E(H,O,O*) represents maximum entropy solution and is estimated in accordance with the following relationship:

$$E(H, O, O^*) = \sum_i p(H_i \mid O_i)\log p(H_i \mid O_i) \quad (8)$$

The term p(H|O) may represent a conditional probability of finding image H given the object function O and the smoothness constraint $\alpha\psi(O,O^*)$ may be selected to impose a smoothness constraint on the object image data O (192).

Similarly, other functions may be used for smoothness constraint $\alpha\psi(O,O^*)$ (214). In some example embodiments, the smoothness constraint $\alpha\psi(O,O^*)$ can be estimated for the object image data O (192) based on total variation minimization in accordance with the following relationship:

$$\psi(O, O^*) = \sum_{ij} \sqrt{|(\nabla_x O)_{ij}|^2 + |(\nabla_y O)_{ij}|^2} \quad (9)$$

In eq. (9), the terms $\nabla_x$, $\nabla_y$ represent x and y gradient operators.

Process 300 may continue from block 306 to block 308, "ITERATIVELY REDUCE THE COST FUNCTION TO OBTAIN THE OBJECT IMAGE DATA", where the cost function (212) can be iteratively reduced by the image processor (130) to obtain the object image data (192) associated with the object (190). In some embodiments, object image data (192) may be selected at an initial time and an approximate minimal value of the cost function (212) may be identified by iteratively evaluating a value of the cost function (212). The object image data (192) may be updated until the approximate minimal value of the cost function (212) is identified. In certain embodiments, the object image data (192) at the initial time can include image data that corresponds to an image with pixel values set to a pre-determined value. In some examples, the object image data (192) at the initial time can include image data that corresponds to an image with all pixel values set to zero. The object image data (192) may be updated by a gradient descent technique that will be described in detail with reference to FIG. 4.

Process 300 may continue from block 308 to block 310, "PROCESS THE OBTAINED IMAGE DATA TO RECOVER THE IMAGE OF THE OBJECT", where the obtained object image data (192) may be processed by the image processor (130) to recover the image of the object (190). In certain embodiments, the obtained object image data (192) may be back-propagated to an image plane by the image processor (130) to recover the image of the object (190). The object image data (192) may be convolved with a back-Fresnel impulse to recover the image of the object (190). In certain embodiments, amplitude and phase information may be determined from the obtained object image data (192), which may be utilized to compute a focused image of the object at a desired depth within the object.

In some example embodiment, the back-propagation of the obtained image data (192) may be performed by convolving the data with a back-Fresnel impulse response represented by the following relationship:

$$h(x, y, -z) = \frac{i}{\lambda z}\exp\left[\frac{-i\pi}{\lambda z}(x^2 + y^2)\right] \quad (10)$$

where, $\lambda$ is wavelength of light used;
z is distance to which back-propagation from hologram is to be computed; and
x, y are transverse coordinates in a plane perpendicular to z.

In terms of Fourier domain filtering, the Fresnel back-propagation method may correspond to a two-dimensional filter defined in accordance with the following relationship:

$$H(f_x,f_y)=\exp[-ikz+i\pi\lambda z(f_x^2+f_y^2)] \quad (11)$$

where: $\lambda$ is wavelength of light used;
z is the distance to which back-propagation from hologram is to be computed; and
$f_x$, $f_y$ are 2D Fourier transform spatial frequencies.

In one example embodiment, the computation with the filter will be performed in accordance with the following relationship:

$$I(x,y)=F^{-1}[F\{O\}H(f_x,f_y)] \quad (12)$$

where I(x, y) is the computed image; and
F, $F^{-1}$ represent forward and inverse 2D Fourier transform operation.

In another example embodiment, the back-propagation of the obtained image data may be performed using angular spectrum algorithm in accordance with the following relationship:

$$h(x, y, -z; \lambda) = \frac{\exp(-ikr)}{2\pi r}\left(ik + \frac{1}{r}\right)\frac{(-z)}{r} \quad (13)$$

where r is estimated in accordance with the following relationship:

$$r=\sqrt{x^2+y^2+z^2} \quad (14)$$

where k is estimated in accordance with the following relationship:

$$k=2\pi/\lambda \quad (15)$$

where z is the distance to which back-propagation from hologram is to be computed; and
x, y are transverse coordinates in a plane perpendicular to z.

In terms of Fourier domain filtering, the angular spectrum method may correspond to a two-dimensional filter defined in accordance with the following relationship:

$$H(f_x,f_y)=\exp[-iz\sqrt{k^2-4\pi^2(f_x^2+f_y^2)}] \quad (16)$$

where, k is estimated in accordance with the following relationship:

$$k=2\pi/\lambda \quad (17)$$

where λ is wavelength of light used;
z is distance to which back-propagation from hologram is to be computed; and
$f_x$, $f_y$ are 2D Fourier transform spatial frequencies.

Again, the computation with the filter will be performed in accordance with the following relationship:

$$I(x,y) = F^{-1}[F\{O\}H(f_x, f_y)] \qquad (18)$$

where I(x, y) is the computed image; and
F, $F^{-1}$ represent forward and inverse 2D Fourier transform operation.

Figure 4:
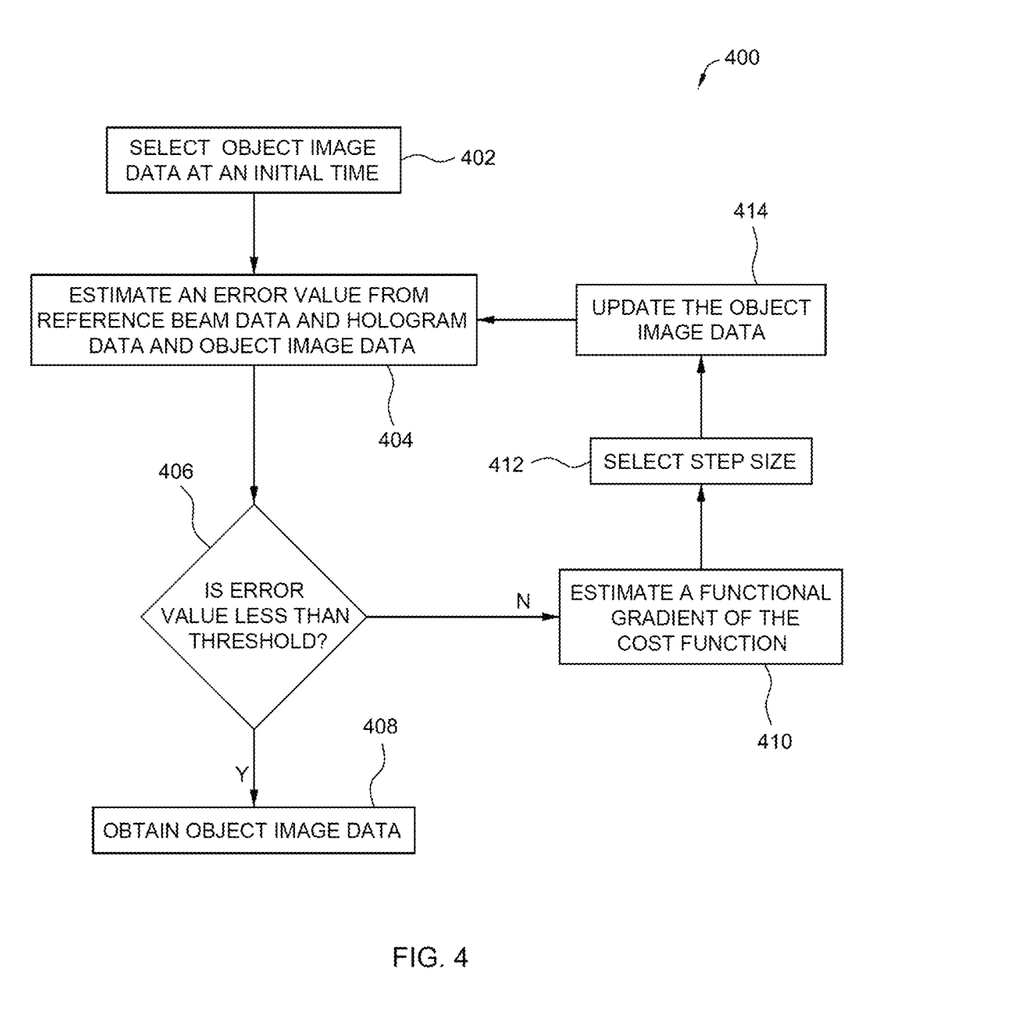
FIG. 4 is an illustration of an example process for obtaining object image data using hologram data and reference beam data.

FIG. 4 is an illustration of an example process 400 for obtaining object image data (192) using hologram data (162) and reference beam data (152), arranged in accordance with at least some embodiments described herein. Process 400 may include one or more operations, functions or actions as illustrated by one or more of blocks 402-414. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation. Process 300 may begin at block 302.

At block 402, "SELECT OBJECT IMAGE DATA AT AN INITIAL TIME", where object image data (192) at an initial time may be selected by the image processor (130). In certain embodiments, the object image data (192) at the initial time can include image data that corresponds to an image with pixel values set to a pre-determined value. In some examples, the object image data (192) at the initial time can include image data that corresponds to an image with all pixel values set to zero, all pixel values set to one, or some other desired value or pattern of values.

Process 400 may continue from block 402 to block 404, "ESTIMATE AN ERROR VALUE FROM REFERENCE BEAM DATA, HOLOGRAM DATA AND OBJECT IMAGE DATA", where an error value can be estimated by the image processor (130) using reference beam data R (152), hologram data H (162) and object image data O (192). As described previously, the reference beam data (152) can correspond to a reference interference pattern (151) and the hologram data (162) can correspond to a captured interference pattern (161) generated by interference between a reference beam (150) and an object beam (160). In some examples, the cost function (212) can be applied by the image processor (130) to the hologram data H (162), the reference beam data R (152) and the object image data O (192) can be a L2 Norm function, and the error value E for the object image data may be estimated by the image processor (130) in accordance with following relationship:

$$E^{(n)} = \| H - |R|^2 - |O^{(n)}|^2 - RO^{(n)*} - R^*O^{(n)} \|^2 \qquad (19)$$

For other cost functions, the error value may be estimated accordingly. In some embodiment, the error value E is iteratively reduced by the image processor (130) to reduce the cost function (212).

Process 400 may continue from block 404 to block 406, "IS ERROR VALUE LESS THAN THRESHOLD?", where the estimated error value can be compared by the image processor (130) with a pre-determined threshold. The pre-determined threshold may be selected based upon a type of the object to be imaged, a desired image resolution and so forth.

Process 400 may continue from block 406 to block 408, "OBTAIN OBJECT IMAGE DATA", where object image data may be obtained by the image processor (130). If the error value at block 306 is less than the threshold then the object image data (192) can be obtained and the iterative reduction of the cost function (183) can be terminated. Moreover, the object image data (192) may be processed to recover the image of the object (190).

The object image obtained using the various techniques described above may have substantially high resolution as compared to image obtained using conventional imaging techniques. In certain examples, the object image can have a resolution that is about 4 times greater than the resolution of an image obtained using conventional imaging techniques. The present techniques of object image recovery from the object image data obtained by performing a constrained optimization of the hologram data provides high quality image recovery even when the dc and twin image terms in the hologram overlap in the Fourier domain. Moreover, the image recovery technique described above facilitates recovery of both phase and amplitude of the object image in the hologram plane for single shot quantitative phase imaging applications.

If the error value is greater than the threshold, the iterative reduction of cost function may continue and the object image data may be updated. The iterative reduction of cost function may include updating the object image data by the gradient descent technique described below.

Process 400 may continue from block 406 to block 410, "ESTIMATE A FUNCTIONAL GRADIENT OF THE COST FUNCTION", where a functional gradient of the cost function (212) can be estimated. In various examples, the cost function (212) can be applied to the hologram data H (162), the reference beam data R (152) and the object image data O (192) can be a L2 Norm function, and the functional gradient of the cost function C (212) can be estimated in accordance with the following relationship:

$$\nabla_{O^*} C(O, O^*) = -[H - (|O|^2 + |R|^2) + OR^* + O^*R](O+R) + \alpha \nabla_{O^*} \psi(O, O^*) \qquad (20)$$

where $\nabla_{O^*} C(O, O^*)$ represents the functional gradient; and
$\alpha \nabla_{O^*} \psi(O, O^*)$ represents functional gradient of the smoothness function.

Process 400 may continue from block 410 to block 412, "SELECT STEP SIZE", where a step size t for updating the object image data (192) can be selected by the image processor (130). In some examples, the step size t may be a positive constant that may be selected by a standard line search method.

Process 400 may continue from block 412 to block 414, "UPDATE THE OBJECT IMAGE DATA", where the object image data (192) can be updated by the image processor (130) using the object image data (192) at the initial time, selected step size, and the functional gradient of the cost function (183). In some examples, the object image data (192) can be updated in accordance with the following relationship:

$$O^{(n+1)} = O^{(n)} - t[\nabla_{O^*} C]_{O=O^{(n)}} \qquad (21)$$

where, $O^{(n+1)}$ is the object image data at nth iteration; and
t is a constant representing a step size.

The process 400 may continue with the iterative updating of the object image data (192) and evaluating a value of the error with respect to the threshold to obtain the updated object image data (192). In some examples, a decrease in the error value can be evaluated by the image processor (130) for each update in the object image data (192) and the object image data (192) can be updated by the image processor (130) until the decrease in error achieves a substantially stable value.

A variety of other techniques may be used for updating the object image data (192). In another example embodiment, the object image data (192) can be iteratively updated using conjugate gradient technique in accordance with the following relationship:

$$\beta_n = \frac{[\nabla_{O^*} C]^*_{O=O^{(n)}} [\nabla_{O^*} C]_{O=O^{(n)}}}{[\nabla_{O^*} C]^*_{O=O^{(n-1)}} [\nabla_{O^*} C]_{O=O^{(n-1)}}} \quad (22)$$

$$s^{(n)} = -[\nabla_{O^*} C]_{O=O^{(n)}} + \beta_n s^{(n-1)} \quad (23)$$

$$O^{(n+1)} = O^{(n)} + t_n s^{(n)}, \quad (24)$$

where $\beta_n$ is a coefficient calculated as per Fletcher-Reeves formula; and $[\nabla_{O^*} C]_{O=O^{(n)}}$ is the gradient of cost function.

In one example embodiment, the $\beta_n$ coefficient is computed using the Polak-Ribiere formula. In yet another example, the $\beta_n$ coefficient is computed using the Hestenes-Stiefel formula.

In additional examples, the object image data (192) can be iteratively updated using Nesterov update technique in accordance with the following relationship:

$$O^{(n+1)} = Q^{(n)} - t_n [\nabla_{Q^*} C]_{Q=Q^{(n)}} \quad (25)$$

$$Q^{(n)} = a(n) O^{(n)} + b(n) O^{(n-1)} \quad (26)$$

In eqs. (25) and (26), the update to the object image data (192) can be evaluated using a linear combination of solutions from two previous iterations, denoted here as $Q_n$.

In various example embodiments, coefficients a(n), b(n) may be computed using the following relationships:

$$a(n) = 1 + (n-1)/(n+2) \quad (27)$$

$$b(n) = -(n-1)/(n+2) \quad (28)$$

In some examples, the smoothness constraint (214) can be implemented by convolving the resultant updated solution with an averaging filter of a selected size. In various examples, the size of the averaging filter may correspond to a window size in the definition of the smoothness constraint. The object image data (192) may be updated with the averaging filter G in accordance with the following relationship:

$$O^{(n+1)} = G \otimes \{O^{(n)} + t[H - (|O^{(n)}|^2 + |R|^2 + O^{(n)} R^* + O^{(n)*} R)] \cdot (O^{(n)} + R)\} \quad (29)$$

where $\otimes$ stands for the convolution operation; and

G is an averaging filter.

The averaging filter G may be selected to have a spatial extent of about half the fringe period in the interference pattern or more. The updated object image data (192) may be processed to recover the image of the object (190).

The image recovery technique described above may be utilized to enable 3D video imaging at high resolution that is not available with the conventional imaging systems. As described before, the technique facilitates single shot quantitative phase imaging and to recover high resolution 3D images of an object.

Figure 5:
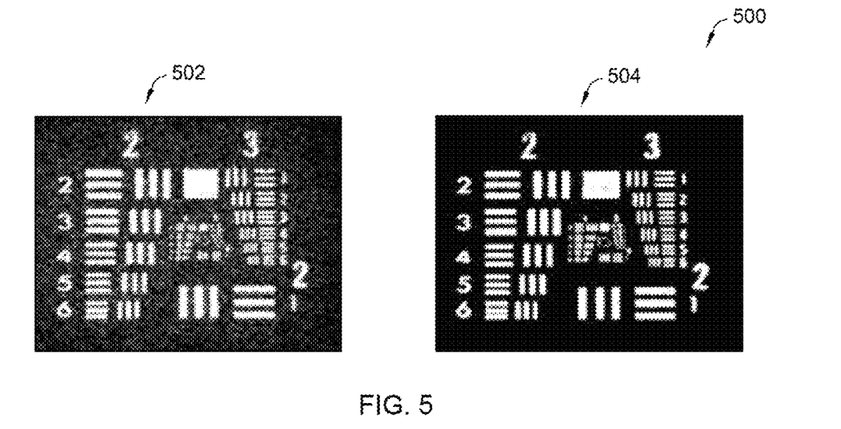
FIG. 5 illustrates example images of an object using a conventional imaging system and the apparatus of FIG. 1.

FIG. 5 illustrates example images 500 of an object from both a conventional holographic imaging system, and the system (100) of FIG. 1, arranged in accordance with at least some aspects described herein. Images obtained using a conventional imaging system can be represented by reference numeral 502. Images obtained using the techniques of the present disclosure (see, e.g., FIGS. 1-4) can be represented by reference numeral 504. As can be seen, the image 504 obtained using the proposed technique had relatively higher resolution compared to the image 502 obtained using a conventional imaging system. In particular, the resolution of the image 502 is limited by the resolution for conventional holographic systems that is estimated by the relationship 2 sin θ/3λ where λ is the wavelength of light used, and θ is the nominal angle between the object beam 160 and the reference beam 150. The resolution of the image 504 is substantially greater than the image resolution estimated by the above relationship for the conventional holographic systems. Further, the image 504 had reduced speckle noise. The ability to achieve single frame high resolution image recovery from the system described above facilitates dynamic three-dimensional imaging of objects without the need of any scanning mechanism.

Figure 6:
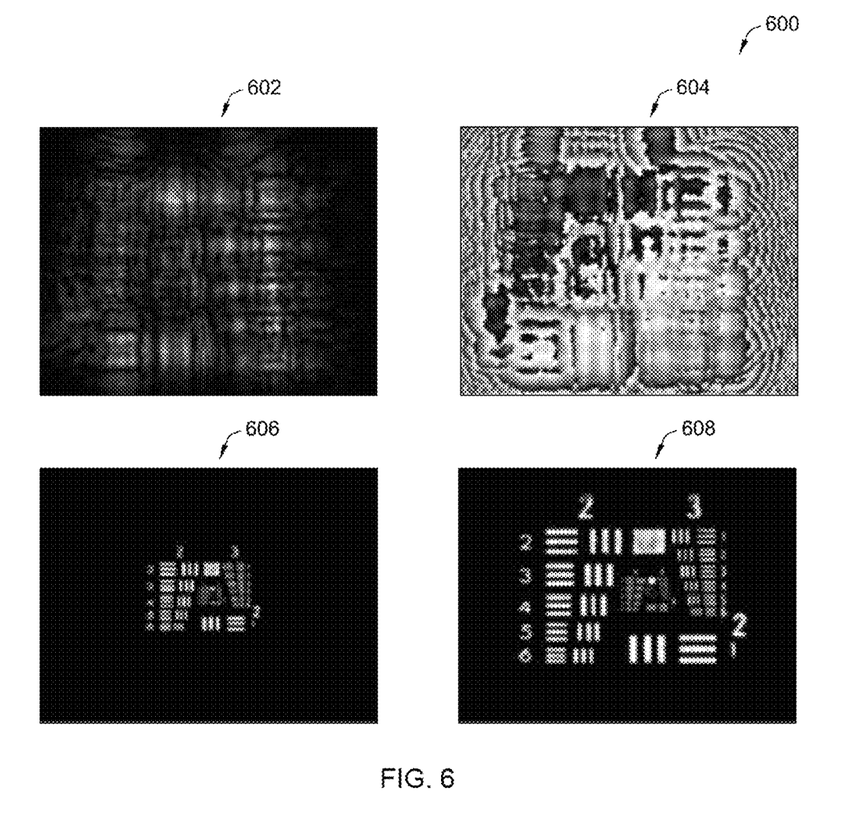
FIG. 6 illustrates example images of an object recovered using the apparatus of FIG. 1.

FIG. 6 illustrates example images 600 of an object recovered using the system (100) of FIG. 1, arranged in accordance with at least some aspects described herein. Images 602 and 604 may represent the amplitude and phase information of the object image in the hologram plane. Further, image 606 is an image obtained by Fresnel back-propagation of the object image data corresponding to images 602 and 604. A magnified portion of the image 606 is shown in image 608. As can be, the contribution of dc and the twin images was not seen in the image 608 and high frequency features appeared to be better resolved as compared to that from a conventional holographic system. Further, the speckle noise was substantially reduced.

Figure 7:
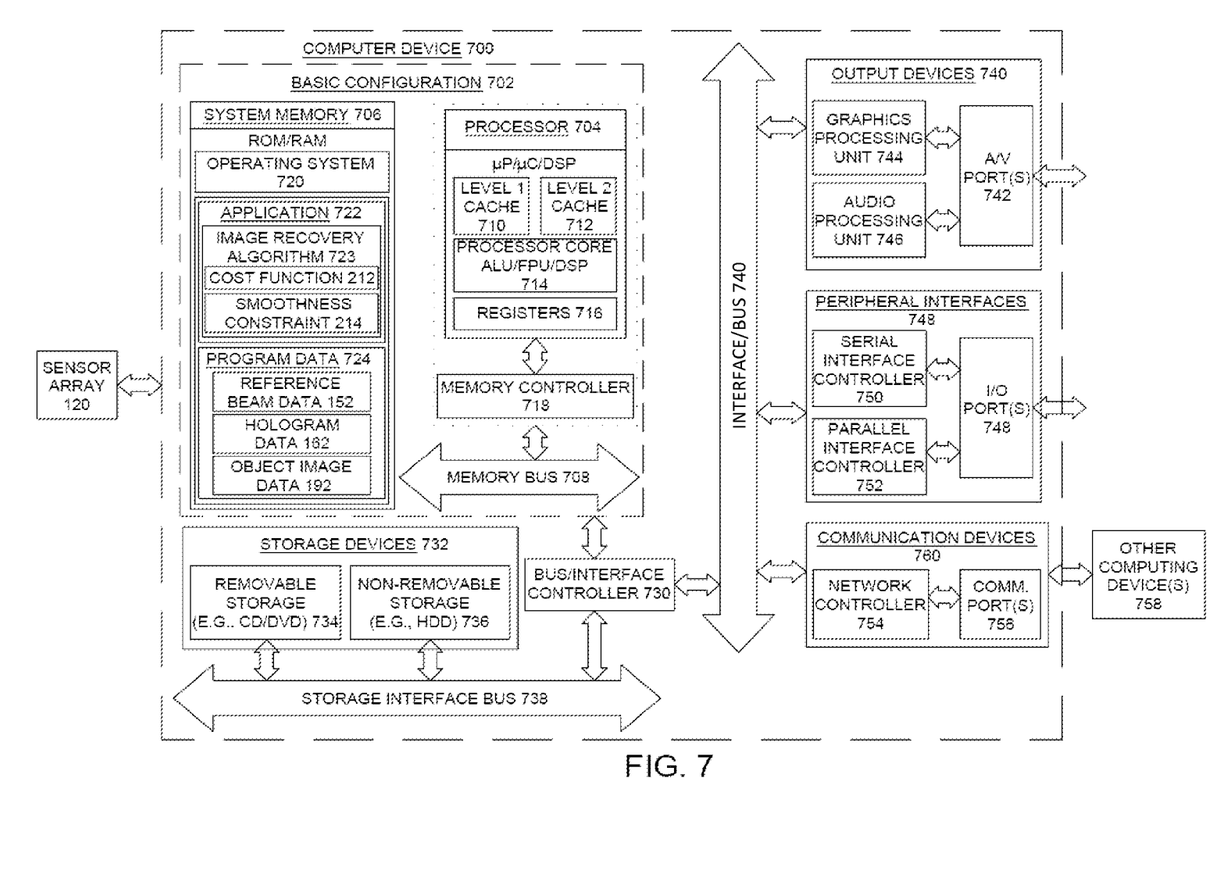
FIG. 7 is a block diagram illustrating an example computing device that is arranged for recovering image of an object from single shot digital hologram, arranged in accordance with at least some embodiments of the present disclosure.

Example Computing Device: FIG. 7 is a block diagram illustrating an example computing device 700 that is arranged for recovering image of an object from a single shot digital hologram in accordance with at least some embodiments of the present disclosure. In a very basic configuration 702, the computing device 700 typically includes one or more image processors 704 and a system memory 706. A memory bus 708 may be used for communicating between image processor 704 and system memory 706.

Depending on the desired configuration, image processor 704 may be of any type including but not limited to a microprocessor (µP), a microcontroller (µC), a digital signal processor (DSP), or any combination thereof. Image processor 704 may include one more levels of caching, such as a level one cache 710 and a level two cache 712, one or more processor cores 714, and registers 716. An example processor core 714 may include an arithmetic logic unit (ALU), a floating point unit (FPU), a digital signal processing core (DSP Core), or any combination thereof. An example memory controller 718 may also be used with image processor 704, or in some implementations memory controller 718 may be an internal part of image processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720, one or more applications 722, and program data 724. Application 722 may include an image recovery algorithm 723 that is arranged to perform the functions as described herein including those described with respect to process 100 of FIG. 1.

Program Data 724 may include reference beam data 152 and hologram data 162 received from the sensor array 120 that may be useful for obtaining the object image data 192. In some embodiments, application 722 may be arranged to operate with program data 724 on the operating system 720 such image recovery of an object may be performed. In some embodiments, the image recovery algorithm 723 may be configured to apply the cost function 212 to the hologram data 162 and the reference beam data 152 and to iteratively reduce the cost function 212 to obtain object image data 192 corresponding to the object 190. In this example embodiment, the image recovery algorithm may be configured to apply a smoothness constraint 214 to the cost function 212. This described basic configuration 702 is illustrated in FIG. 7 by those components within the inner dashed line.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 738. Data storage devices 732 may be removable storage devices 734, non-removable storage devices 736, or a combination thereof.

Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 734 and non-removable storage devices 736 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752.

Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

The example embodiments described above provides techniques for three-dimensional (3D) imaging of a variety of objects without the use of contrast agents such as dyes and other fluorescent labels. The apparatus for image recovery facilitates recovery of images with higher resolution relative to resolution of images obtained using conventional digital holographic microscopy systems. The technique facilitates high resolution image recovery from a single shot digital hologram without requiring multiple hologram frames. The achieved dynamic high resolution of the obtained images is substantially higher than resolution of images obtained by conventional holographic imaging systems. The present technique may be used for image recovery in a variety of applications such as biosciences, optical metrology applications, applications involving images to be encrypted holographically for security reasons, 3D display applications, biometrics, among others.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method to recover an image of an object, the method comprising:
   receiving reference beam data that corresponds to a reference interference pattern;
   receiving hologram data that corresponds to the object;
   applying a cost function to the hologram data and the reference beam data to determine object image data associated with the object, wherein the cost function includes a smoothness constraint applied to the object image data;
   selecting object image data at an initial time;
   identifying an approximately minimal value of the cost function by iteratively:
      evaluating a value of the cost function; and
      updating the object image data until the approximately minimal value of the cost function is identified; and
   processing the object image data to recover the image of the object.

2. The method of claim 1, wherein receiving the hologram data comprises:
   splitting a beam from a light source into the reference beam and an object beam; transmitting the object beam to the object; and
   generating the hologram data based on interference between the reference beam and the object beam.

3. The method of claim 2, wherein transmitting the object beam comprises reflecting the object beam from the object.

4. The method of claim 1, wherein applying the cost function comprises applying the cost function using least squares (L2-norm), weighted least squares, maximum entropy reconstruction, maximum-likelihood reconstruction, expectation maximization reconstruction, or combinations thereof.

5. The method of claim 1, wherein applying the cost function,. denoted as C to the hologram data, denoted as H, the reference beam data, denoted as R and object image data, denoted as O, comprises applying the cost function C in accordance with a relationship:

$$C(O,O^*)=1/2||H-(|O|^2+|R|^2+OR^*+O^*R)||^2+\alpha\psi(O,O^*)$$

where $\alpha\psi(O,O^*)$ is the smoothness constraint.

6. The method of claim 5, further comprising estimating the smoothness constraint $\alpha\psi(O,O^*)$ for the object image data O in accordance with a relationship:

$$\alpha\psi(O, O^*) = \sum_P \sum_{q \in N_p} w_{pq}|O_p - O_q|^2,$$

where $\alpha$ is a weight parameter, $O_p$ is a value of O at a $p^{th}$ pixel, index q is a neighborhood pixel of p and $w_{pq}$ is a weight function.

7. The method of claim 1, wherein selecting the object image data comprises providing image data that corresponds to an image with pixel values set to a particular value.

8. The method of claim 1, wherein updating the object image data comprises updating the object image data by a gradient descent technique.

9. The method of claim 8, wherein updating the object image data by the gradient descent technique comprises:
   estimating a gradient of the cost function, denoted as C, in accordance with a relationship: $\nabla_{O^*}C(O,O^*)=-[H-(|O|^2+|R|^2)+OR^*+O^*R](O+R)+\alpha\nabla_O\psi(O,O^*)$ where H denotes the hologram data, R denotes the reference beam data, and O denotes the object image data; and
   updating the object image data in accordance with a relationship:
   $O^{(n+1)}=O^{(n)}-t[\nabla_{O^*}C]_{O=O^{(n)}}$ where $O^{(n+1)}$ is the object image data at $(n+1)^{th}$ iteration and t is a constant representing a step size.

10. The method of claim 1, wherein processing the obtained object image data comprises back-propagating the object image data to an image plane to recover the image of the object.

11. The method of claim 10, wherein back-propagating the object image data comprises convolving the object image data with a back-Fresnel impulse response to recover the image of the object.

12. The method of claim 1, further comprising determining amplitude and phase information from the object image data to compute a focused image of the object at a specific depth within the object.

13. A method to recover an image of an object, the method comprising:
   receiving a reference beam from a light source;
   receiving an object beam that is returned from the object;
   generating an interference pattern from the reference beam and the object beam;
   obtaining hologram data and reference beam data that corresponds to the interference pattern and a reference interference pattern respectively;
   applying a cost function to the hologram data and the reference beam data to determine object image data that corresponds to the object, wherein the cost function includes a smoothness constraint applied to the object image data;
   selecting object image data at an initial time;
   identifying an approximately minimal value of the cost function by iteratively:
   evaluating a value of the cost function; and
   updating the object image data until the approximately minimal value of the cost function is identified; and
   processing the obtained object image data to recover the image of the object.

14. The method of claim 13, wherein applying the cost function comprises applying the cost function as one or more of least squares (L2-norm), weighted least squares, maximum entropy reconstruction, maximum-likelihood reconstruction, or combinations thereof.

15. The method of claim 13, wherein processing the obtained object image data comprises back-propagating the object image data to an image plane to recover the image of the object.

16. The method of claim 13, further comprising:
   determining amplitude and phase information from the obtained object image data; and
   computing a focused image of the object at a specific depth within the object using the amplitude and phase information.

17. An apparatus configured to recover image data associated with an object, the apparatus comprising:
   an optical assembly configured to: receive a reference beam, receive an object beam associated with the object, and interfere the reference beam with the object beam effective to generate an interference pattern; and
   an image processor configured to:
   receive an output of the optical assembly,
   apply a cost function to hologram data and reference beam data, wherein the hologram data corresponds to the interference pattern and the reference beam data corresponds to a reference interference pattern,
   select object image data at an initial time,
   identify an approximately minimal value of the cost function by iterative:
   evaluation of a value of the cost function, and
   performance of an update of the object image data until the approximately minimal value of the cost function is identified to obtain object image data corresponding to the object.

18. The apparatus of claim 17, wherein the image processor is configured to apply a smoothness constraint to the cost function.

19. The apparatus of claim 17, wherein the image processor is configured to process the obtained object image data to recover an image of the object.

20. The apparatus of claim 17, wherein the optical assembly comprises a light source configured to generate the reference beam and wherein the reference beam is transmitted to the object to generate the object beam.

21. The apparatus of claim 20, wherein the light source is configured to generate a ultra violet (UV) beam, a visible beam, an infrared beam, a terahertz beam, X-ray beam or combinations thereof.

22. The apparatus of claim 17, wherein the optical assembly comprises a sensor array that is configured to receive the interference pattern.

23. The apparatus of claim 17, wherein the optical assembly comprises one or more of a Mach-Zehnder interferometer, a Michelson Twyman-Green interferometer, a point-diffraction interferometer, a shearing interferometer, a Talbot interferometer, or combinations thereof.

24. The apparatus of claim 17, wherein the image processor is configured to recover an image of the object with an image resolution that is substantially greater than the image resolution estimated in accordance with the relationship: $2\sin(\theta)/3\lambda$, where $\lambda$ is wavelength of the light beam, and $\theta$ is the nominal angle between the object beam and the reference beam.

25. An apparatus configured to recover image data associated with an object, the apparatus comprising:
   a light source configured to generate a beam;
   a first beam splitter configured to split the beam into a reference beam and an object beam, wherein the object beam is transmitted to the object;
   a sensor array configured to receive an interference pattern generated by interference of the reference beam with the object beam; and
   an image processor configured to:
   receive an output of the optical assembly,
   apply a cost function to hologram data and reference beam data, wherein the hologram data corresponds to the interference pattern and the reference beam data corresponds to a reference interference pattern,
   select object image data at an initial time,
   identify an approximately minimal value of the cost function by iterative:
   evaluation of a value of the cost function, and
   performance of an update of the object image data until the approximately minimal value of the cost function is identified to obtain object image data corresponding to the object.

26. The apparatus of claim 25, further comprising a second beam splitter to facilitate interference of the reference beam and the object beam.

27. The apparatus of claim 25, further comprising a first mirror and a second mirror configured to deflect the reference beam and the object beam respectively at a specific angle.

28. The apparatus of claim 25, further comprising a microscope objective configured to generate the interference pattern from the interference of the reference beam and the object beam.

29. The apparatus of claim 25, wherein the image processor is configured to apply a smoothness constraint to the cost function.

30. The apparatus of claim 17, wherein the image processor is configured to process the obtained object image data to recover an image of the object.

* * * * *